Dec. 9, 1969       A. H. RICE ET AL       3,482,694
METHOD AND APPARATUS FOR SEPARATION OF SOLIDS FROM LIQUIDS
Filed June 27, 1967
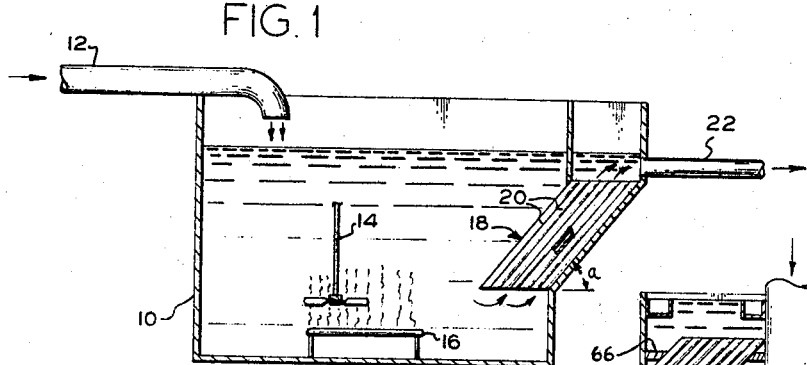
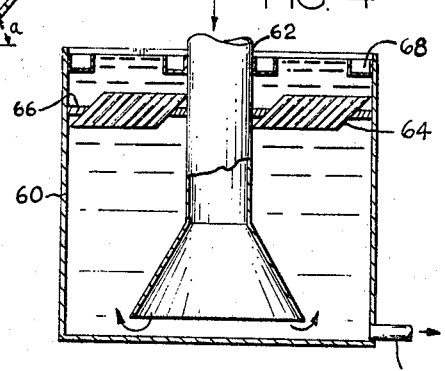
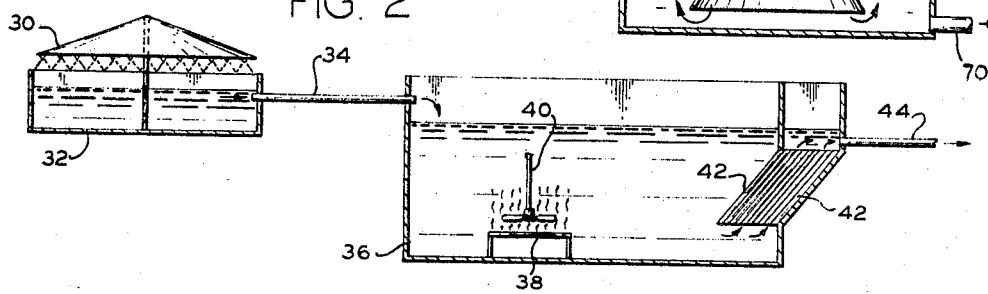
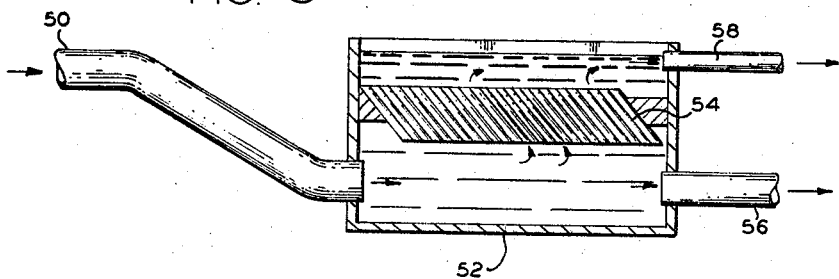
WALTER R. CONLEY, J
GORDON L. CULP
SIGURD P. HANSEN
ARCHIE H. RICE
INVENTORS.
BY
BUCKHORN, BLORE, KLARQUIST & SPARKMAN
ATTORNEYS

United States Patent Office 3,482,694
Patented Dec. 9, 1969

3,482,694
METHOD AND APPARATUS FOR SEPARATION OF SOLIDS FROM LIQUIDS
Archie H. Rice, Gordon L. Culp, Walter R. Conley, Jr., and Sigurd P. Hansen, Corvallis, Oreg., assignors to Neptune Microfloc Incorporated, Corvallis, Oreg., a corporation of Oregon
Filed June 27, 1967, Ser. No. 649,301
Int. Cl. B01d 21/00
U.S. Cl. 210—73         3 Claims

ABSTRACT OF THE DISCLOSURE

Settleable solids are removed from liquids by passing liquids upwardly through elongated tubes of small diameter inclined at an acute angle of greater than 45° to horizontal. Solids settle on bottoms of tubes and continually slide out lower end.

BACKGROUND OF INVENTION

In pending application Ser. No. 553,401, filed May 27, 1966, now Patent 3,399,135, there is described a solids-liquid separating apparatus comprising a plurality of substantially horizontal tubes through which water or other liquid carrying a settleable material is passed in a streamline flow condition to permit the settleable material to deposit within the tubes. These tubes are periodically cleaned by draining the liquid therefrom and which causes the settleable material to be carried out as the final water or liquid drains from the tubes. This, of course, requires periodic shut-down of the apparatus for the cleaning.

Also in French Patent No. 994,118, a separating device is described having a plurality of inclined trays over which liquid is passed. Periodic cleaning of such trays is taught as by tilting them to let the material slide out, by backwashing, or by vibrating the blades to cause the material to flow downwardly while they are tilted.

SUMMARY OF THE INVENTION

It has now been discovered that if a separating device is provided with tubes maintained at an angle to the horizontal of between about 45° to 75° the settleable material will still deposit on the inclined bottoms of the tubes so that substantial clarification of the liquid may be obtained as it passes through the tubes but the deposited material will also continually slide on the bottom of the tube toward the lower end so that a continuous self-cleaning operation is maintained.

Maintaining the tubes at an angle wherein they are self-cleaning provides substantial advantages. The principal advantage is, of course, that the apparatus in which they are operated may be run continuously without shut-down. Other advantages will accrue from the environments in which the tubes may be used. For example, they may be employed to effect discharges of effluent from activated sludge treatment units. The solids are continually and quickly returned to the aeration compartment which is highly desirable, while a substantially clarified liquid is continually withdrawn from the compartment. This enhances the stability of the activated sludge system and eliminates the necessity for a separate sedimentation tank which has been utilized heretofore.

Furthermore, the tubes may be provided in systems such as in a sewage and storm water drainage system to enable separation of substantially clarified volumes of water during storm drainage while passing the solids carrying water to a sewage plant.

A major use of the tubes will be for water clarification devices, for example, in the modification of existing upflow clarifiers to increase the flow rate and improve quality. Another example will be in the fabrication of new clarifiers of low cost and high performance.

Other advantageous installations such as those which can be realized in other water treatment processes will be apparent to those skilled in the art.

DRAWINGS

FIG. 1 illustrates the incorporation of a settling device made in accordance with the invention in an activated sludge waste treatment system;

FIG. 2 illustrates the incorporation of the device in a trickling filter system;

FIG. 3 illustrates the incorporation of the device into a sewage system for separating clarified volumes of water during storm water run-off; and FIG. 4 illustrates the incorporation of the device into a water clarification device.

DESCRIPTION OF THE PREFERRED EMBODIMENTS

Referring to FIG. 1, illustrated at 10 is an aeration tank of an activated sludge treatment system into which raw sewage or waste is discharged by a pipe 12. The tank 10 is provided with suitable aeration devices including agitators 14 and an air distributing device 16. In accordance with the invention, a solids separating apparatus or settling device 18 is provided through which the sewage or waste discharging from the tank 10 must pass and which device effects continual removal of settleable solids from the discharging sewage or waste. The settling device 18 comprises a plurality of elongated tubes or conduits 20 of relatively small diameter inclined upwardly from the horizontal at an acute angle $a$ of greater than 45° and preferably between 55° to 75°, the optimum angle being about 60°. The effluent discharging from the upper ends of the settling device 18 is collected and discharged through a pipe 22 to the receiving stream or for further processing as, for example, by filtration in a filter which may be constructed in accordance with pending application, Ser. No. 345,204, filed Feb. 17, 1964, now Patent 3,343,680.

The tubes or conduits 20, if round, preferably have a diameter of between about one and six inches. While round tubes of diameter less than one inch may in some instances be utilized and would, in fact, more effectively cause removal of settleable material, tubes of such small diameter tend to plug up, and desired continual removal of the deposited sludge is not ordinarily obtained. With tubes of diameter larger than six inches eddy currents are more likely to develop in the tubes interfering with the settling of solid materials therein.

Instead of being round, the tubes may have other configurations such as those shown in application Ser. No. 553,401, filed May 27, 1966, now Patent 3,399,135. Whatever the configuration, these tubes should have a cross-sectional area between about those of one-inch and six-inch diameter, round tubes, i.e. between about one square inch and twenty-seven square inches, and should have a vertical dimension, i.e. a dimension perpendicular to the tube axis of between about one and six inches.

A sufficient number of tubes is provided so that at the design capacity of the apparatus the total cross-sectional area of the tubes will enable streamline flow conditions to develop within the tubes. This will occur when linear flow rates are maintained below about 0.04 ft. per second, or about 18 g.p.m./ft.$^2$.

Minimal permissible tube length varies inversely with the diameter or vertical dimension of the tubes. With tubes of a diameter of one to two inches, a length of two feet will ordinarily enable desirable turbidity removal with settleable floc such as normally encountered in water and sewage treatment. For tubes of larger diameter, longer tubes may be desired. For liquids heavily laden with settleable material tubes of greater length will ordinarily be required than with liquids carrying smaller concentrations of solids.

A coagulant aid such as activated silica or an organic polyelectrolyte, such as those sold under the trademark Magnafloc 990, and Separan NP–10, a polyacrylamide, will frequently effect more efficient settling of the solid material within the tubes. In some instances, the most effective separation will be obtained when the coagulant aid is added to the water immediately prior to its entrance into the settling device. At other times, more effective treatment will be obtained when the coagulant aid is added at the time the sewage enters the aeration basin or flocculation basin.

In operation, the activated sludge or "mixed liquor," from the tank 10 enters the tubes of the settling device 18 at the bottom and flows slowly upwardly through the tubes 20 while the bacterial solids settle to the bottoms of the tubes. The settled bacterial solids flow downwardly by gravity along the bottoms of the tube and are returned to the aeration tank 10 whereas the clarified effluent discharges from the tubes at the tops thereof and is carried away by a pipe 22.

A continual and rapid return of the settled bacterial protoplasm in an activated sludge system is of great advantage in improving the performance and stability of the system. It avoids the consequences of holding sludge as is presently done in a sedimentation tank which, of course, requires substantial space, and, moreover, causes release of soluble BOD and phosphates from the settled protoplasms to the treated effluent, as well as denitrification of the liquid to provide oxygen for the settled sludge. The released nitrogen forms bubbles which float the sludge to the surface, making the sedimentation tanks ineffective at times.

The invention may also be utilized in other systems, such as, for example, to improve the efficiency of a conventional trickling filter system as shown in FIG. 2 wherein sewage or industrial waste is applied by a sprinkler 30 over a trickling filter 32 from which effluent is withdrawn by a line 34 to an existing sedimentation tank 36.

The tank 36 is converted to an activated sludge tank by placing therein suitable aeration apparatus indicated by the aerating device 38 and an agitator 40. The effluent from the sedimentation tank is withdrawn through a settling device 42 substantially as described above, the clarified effluent that is emitted from the top of the settling device being withdrawn through a line 44. Effluent from trickling filters is ordinarily only about 85 percent stabilized because of the presence of soluble organics and suspended bacterial solids in the effluent discharging from the filter. Aeration of this liquid in the tank 36 will allow effluent BOD reductions of over 95 percent when coupled with effluent filtration.

The increasing emphasis on pollution control and the increasing limitations on the discharge of BOD containing materials into water courses has created serious problems on systems having combined sanitary sewage and storm-water runoff collection. In most systems, the treatment facilities are not capable of taking the increased flow of the sewers resulting from heavy rain-falls as a result of which the excess flow is bypassed around the treatment plant or so overloads the treatment plant that inefficient treatment is obtained. In accordance with the invention, a settling device is incorporated into a storm-water runoff and sanitary sewage system to effect a concentration of solids and enable the clarified effluent to be discharged into the receiving water course.

Referring to FIG. 3, there is shown therein a system including an inlet pipe 50 carrying storm-water and sewage and which leads into a basin or collecting sump 52 having a settling device 54 mounted therein, the tubes of the settling device inclined at an angle of between 45° and 60° to the horizontal. The solid particulate matter in the sewage deposited upon the bottoms of the tubes of the settling device, in the manner described previously, is continually discharged into the basin 52 so as to be carried away with the effluent to the discharge line 56 which leads to the treatment plant. The water emitted from the tops of the tubes 54 will have a substantial proportion of the solid material removed therefrom and may be carried away by a line 58 for discharge to the receiving water course. The outlet 58 is positioned at an elevation such that under normal conditions all flow is directed to the discharge line 56 and so that as flow increases during storm-water runoff the settling device 54 will be rendered operative.

FIG. 4 illustrates the incorporation of the device into an upflow clarifier which includes a basin 60 into which the water to be clarified is introduced through an inlet tube 62. Settling devices 64 are provided in the upper part of the basin and partitions 66 are provided to force the upflowing water to pass through the tubes of such devices. Troughs 68 collect the clear water for conveyance to the accepting system. The solids depositing in the tubes of the devices 64 will continually slide out of the lower ends and will collect upon the bottom of the basin 60. A drain line 70 may be provided for periodically draining collected sludge from the bottom of the basin.

Upflow clarifiers are ordinarily limited to between 1 and 2 g.p.m./ft.$^2$ flow rate because of floc carryover if these rates are exceeded. Existing clarifiers that are performing poorly because of overload can be upgraded by the use of the inclined tubes to permit satisfactory operation up to rates as high as 8 g.p.m. per square foot. Similarly, the use of the inclined tubes permits the design of superior clarification units which are lower in cost because of small size. A typical design will contain ⅓ to ⅕ of the volume of a conventional clarifier.

Having illustrated and described certain preferred embodiments of the invention it should be apparent that the invention permits of modification in arrangement and detail. We claim all such arrangements as come within the scope and purview of the appended claims.

We claim:

1. In an activated sludge liquid waste treatment process wherein waste is aerated in a tank into which the waste is continuously fed:
   the improvement which comprises continuously withdrawing waste from said tank by passing the same, at a velocity such that the waste assumes the characteristics of streamline flow, upwardly through elongated tubes of small diameter relative to their length and inclined at an acute angle to the horizontal of about 45° to 75° with the lower ends of said tubes exposed to said tank depositing solids in said waste upon the bottoms of said tubes, said solids continually discharging back into said tank by sliding down said tubes thereby enhancing the maintenance of bacterial protoplasm in said tank to effect more rapid and complete digestion of the waste.

2. In the treatment of sewage and industrial wastes the steps comprising:
   continuously passing said wastes through a trickling filter;
   continuously collecting the effluent from said trickling filter and subjecting the same to activated sludge treatment by aerating said effluent in a holding tank, and continuously withdrawing waste from said tank by passing the same, at a velocity such that the waste assumes the characteristics of streamline flow, upwardly through elongated tubes of small diameter relative to their length and inclined at an acute angle to the horizontal of about 45° to 75° with the lower ends of said tubes exposed to said tank depositing solids in said waste upon the bottoms of said tubes, said solids continually discharging back into said tank by sliding down said tubes thereby enhancing the maintenance of bacterial protoplasm in said tank to effect more rapid and complete digestion of the waste.

3. In a sewage system, a pipe for collecting sewage and storm water drain off, a sump for receiving the discharge of said pipe, the discharge end of said pipe being positioned in the lower portion of said sump, a liquids-solids separating device positioned in said sump above the point of said discharge end of said pipe, said device comprising a plurality of elongated tubes of small diameter inclined at an acute angle relative to the horizontal of about 45° to 75°, first conduit means connected to said tank at an elevation below said device for conducting materials to a treatment facility, second conduit means connected to said tank at an elevation above said device for conducting away liquid discharging from said tubes, said tubes having sufficient total cross-section in relation to that of said pipe that at the maximum discharge rate of materials into said tank from said pipe, the flow rate through said tubes will assume the characteristics of laminar flow whereby solid materials will deposit upon the bottoms of said tubes and continually slide outwardly of the bottom end thereof so as to be conveyed away to said treatment facility and the effluent discharging from the tops of said tubes will be clarified relative to the material discharging into said sump from said pipe.

References Cited

UNITED STATES PATENTS

| | | | |
|---|---|---|---|
| 2,060,166 | 11/1936 | Bowen | 210—521 X |
| 2,069,024 | 1/1937 | Vohmann et al. | 210—84 X |
| 2,458,163 | 1/1949 | Hays | 210—9 X |
| 2,868,384 | 1/1959 | Punnington | 210—521 |

FOREIGN PATENTS

| | | |
|---|---|---|
| 987,881 | 8/1941 | France. |
| 635,611 | 4/1950 | Great Britain. |
| 746,980 | 3/1956 | Great Britain. |
| 901,975 | 7/1962 | Great Britain. |

REUBEN FRIEDMAN, Primary Examiner

JOHN W. ADEE, Assistant Examiner

U.S. Cl. X.R.

210—84, 522, 259